(No Model.)

C. F. PIKE.
TRAP FOR LAVATORIES, &c.

No. 301,458. Patented July 1, 1884.

Witnesses:
Geo. Ferguson
J. Geinsinger

Inventor
Chas. F. Pike
By S. J. Van Staworen
Attorney.

UNITED STATES PATENT OFFICE.

CHARLES F. PIKE, OF PHILADELPHIA, PENNSYLVANIA.

TRAP FOR LAVATORIES, &c.

SPECIFICATION forming part of Letters Patent No. 301,458, dated July 1, 1884.

Application filed January 25, 1883. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Lavatories, &c., of which the following is a specification, reference being had therein to the accompanying drawings, wherein—

Figure 1:
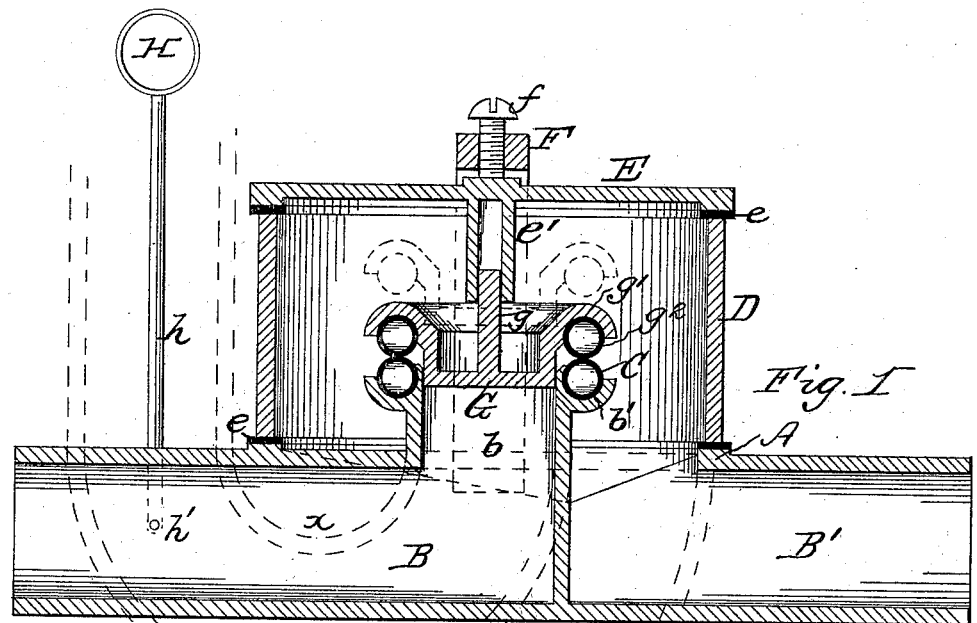
Figure 2:
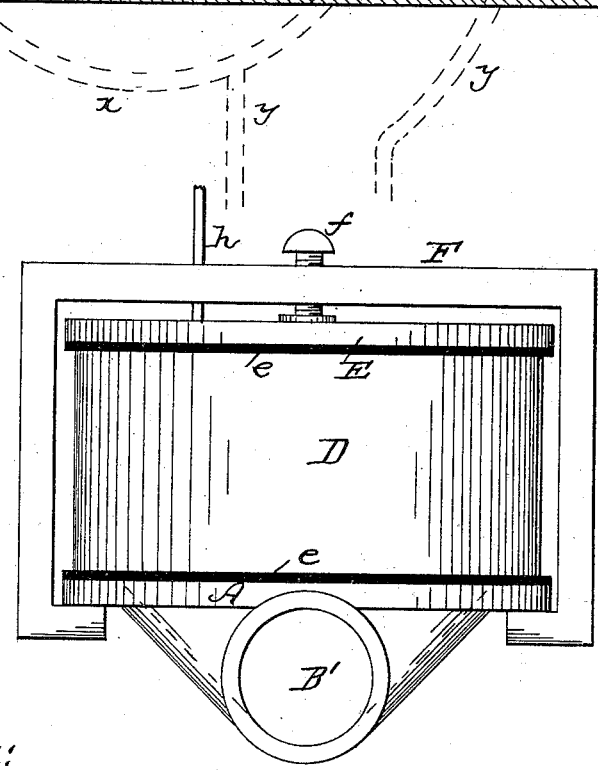

Figure 1 is a longitudinal vertical section of my improved trap, and Fig. 2 is an end elevation of the same.

My invention has relation to that class of traps for wash-basins, bath-tubs, and other like fixtures wherein a disk or similar valve is employed to effect a seal for preventing the escape of sewer gas or odors therefrom, and has for its object to simplify and improve the construction of the same, and provide a more effectual seal therefor.

My invention accordingly consists of the novel combination, construction, and arrangement of the parts of the trap, as hereinafter described and claimed.

Referring to the accompanying drawings, A represents a bottom plate or base for the trap, having induction-pipe B and eduction-pipe B' formed integral therewith. The induction-pipe terminates in a bend, $b$, having a grooved edge, $b'$, which projects above the plate A. In said groove $b'$ is placed a packing of rubber or other elastic material, of any desired configuration in cross-section; but I prefer to use a rubber tube, C, which is formed into an annulus and sprung into said groove.

D represents a tubular casing; E, a top or plate therefor, and $e\ e$ are gaskets interposed between said casing and the top and bottom plates, A and E. Said parts are held in position by means of a yoke, F, and set-screw $f$. From the plate or top E depends a socket or bearing, $e'$, for a guide-rod, $g$, on disk or valve G. The latter is provided with a groove, $g'$, into which is sprung or otherwise secured an annulus, $g^2$, of hollow rubber; or other suitable elastic or flexible packing may be substituted therefor. The annulus or packing $g^2$ has its seat upon elastic packing C, and thereby forms a seal for the trap. Said seal, being formed by two elastic surfaces, is not broken by hairs or similar substances lodging on the elastic surfaces, as the latter readily accommodate themselves to any irregularities that may be formed thereon or are inherent therein. Consequently such construction affords an effective and durable seal.

The operation is obvious. When the trap is attached to a wash-stand or other fixture, the waste water therefrom lifts the disk or valve G and escapes into the soil-pipe. Said disk descends by gravity to seal the outlet of the induction-pipe. The trap is provided with a pipe, $h$, connected to the induction-pipe, as shown at $h'$, Fig. 1, and it leads to a water-pipe, H, or a constant source of fluid-supply. This pipe is attached to the induction-tube between the inlet and outlet, which is ordinarily closed by the valve. By using this construction I am enabled to keep a constant pressure of water against the gas which may try to force its way from the eduction-tube. Furthermore, the water will not sink below the angle of the induction-tube, and thus admit gas. It also keeps the valve very sensitive, so that if a solid should come to the outlet it will readily permit it to pass to the eduction-pipe, and then fall back into place. The pipe $h$ may be provided with a cock, or have a bore of such proportion to that of pipe H that the volume of water passing through said pipe $h$ is optionally determined or regulated as desired. The flow from said pipe passing into the induction-pipe gradually fills the same, until its pressure is sufficient to lift the valve G and escape therefrom. By so doing, it repeatedly flushes the induction-pipe, valve G, seat C, and eduction-pipe, thereby cleansing their walls of all fungus-growth, or preventing stagnation of water or fluid in the trap whereby such germs may be generated, as explained in another application of even date herewith.

If desired, the casing D and top E may be formed in one piece, and screwed, bolted, or otherwise secured to plate A.

The dotted lines $x\ y$ respectively represent the formation of the induction and eduction pipes when the trap is designed to be connected to a vertical soil or waste pipe.

It will be noted that the discharge from pipe $h$ is not regulated or governed by the opening and closing of valve G; that said discharge is constant; that the hydrostatic pressure of such discharge opens valve G and flushes the trap, and that the provision of said valve and the inlet water-pipe $h$ affords a double seal for the trap, so that, if the supply be accidentally or otherwise cut off to pipe $h$, the trap would still be sealed by the valve G.

I am aware that traps having valves or water-seals and water-inlet pipes are not new; but they have heretofore been so arranged that the inlet-pipes only discharge water into the traps when they are unsealed by the opening of the valves or the falling of the water below the sealing-line. Such arrangement leaves the traps open or unsealed in the intervals elapsing between the breaking of the trap-seals and their renewal by the discharge from the inlet water-pipe, and such discharge being cut off as soon as the seal is restored the trap is not flushed thereby, whereas in my improved trap, as above described, the seal therefor is never broken, it being maintained by either the valve G, or by the water from pipe $h$ should said valve be open, and when in the latter position the flushing of the trap is effected.

I do not claim in this application the peculiar form of plate having induction and eduction pipes, the exit for said induction-pipes being above the plate and inclosed by a case attached to said plate; nor do I claim a trap having an eduction-tube provided at its outlet with a valve disconnected from the other parts of the trap, and a water-supply pipe connected with said trap by a smaller pipe, which is provided with means for optionally determining the flow therethrough, as these form the subjects-matter of separate applications filed on the same day as this.

What I claim is—

1. The combination of plate or bottom A, having induction and eduction pipes or openings, and a grooved edge, $b'$, having an elastic seat, C, with the valve G, having packing $g^2$, and a casing secured to plate A, substantially as shown and described.

2. The combination of bottom plate, A, having induction and eduction pipes B B', and bend $b$, with elastic packing or seat C, the valve G packed at $g^2$, and casing D E, having socket or bearing $e'$, substantially as shown and described.

In testimony whereof I affix my signature in presence of two witnesses.

CHAS. F. PIKE.

Witnesses:
S. J. VAN STAVOREN,
CHAS. F. VAN HORN.